(12) United States Patent
Hollars et al.

(10) Patent No.: US 7,677,531 B1
(45) Date of Patent: Mar. 16, 2010

(54) NON-AXIAL ACTUABLE VALVE CAPABLE OF RETAINING BOTH HIGH AND LOW PRESSURES

(76) Inventors: Anthony Scott Hollars, Genuine Innovations, Inc., 2700 E. Bilby Rd., Tucson, AZ (US) 85706; Thomas F. Janecek, 2303 W. Lantern La., Flagstaff, AZ (US) 86001

( * ) Notice: Subject to any disclaimer, the term of this patent is extended or adjusted under 35 U.S.C. 154(b) by 1049 days.

(21) Appl. No.: 11/345,771

(22) Filed: Feb. 2, 2006

(51) Int. Cl.
*F16K 31/00* (2006.01)

(52) U.S. Cl. ......................................... 251/339; 119/75

(58) Field of Classification Search ................. 251/339, 251/238, 82, 83, 363; 119/75, 72, 74, 78, 119/72.5; 277/350, 447, 502, 531, 579, 584, 277/587
See application file for complete search history.

(56) References Cited

U.S. PATENT DOCUMENTS

| | | | |
|---|---|---|---|
| 4,262,915 A | * | 4/1981 | Williams .................... 277/584 |
| 4,370,948 A | * | 2/1983 | Atkins ........................ 119/72.5 |
| 4,391,225 A | * | 7/1983 | Sparks ....................... 251/339 |
| 4,402,343 A | * | 9/1983 | Thompson et al. .......... 251/339 |
| 4,539,938 A | * | 9/1985 | Maranell et al. .............. 119/75 |
| 4,573,433 A | * | 3/1986 | Thompson ................. 119/72.5 |
| 4,633,816 A | * | 1/1987 | Ove et al. ................... 119/72.5 |
| 4,819,585 A | * | 4/1989 | Dolan et al. ................ 119/72.5 |
| 6,758,478 B1 | * | 7/2004 | Moreno ...................... 277/584 |

* cited by examiner

*Primary Examiner*—Stephen Hepperle
*Assistant Examiner*—Andrew J Rost
(74) *Attorney, Agent, or Firm*—Dale F. Regelman; Quarles & Brady LLP

(57) ABSTRACT

The present invention relates to improved fluid valves actuable by a non-axial movement of an actuation stem. The non-linear actuable valves embodied in the present invention maintain pressure containment through a novel approach over the prior-art. The exemplary embodiments teach improved non-linear actuable valves that reduce the chances for seal extrusion, particularly at elevated retaining pressure, while keeping the component count low, and are capable of functioning under both high and low pressure.

2 Claims, 17 Drawing Sheets

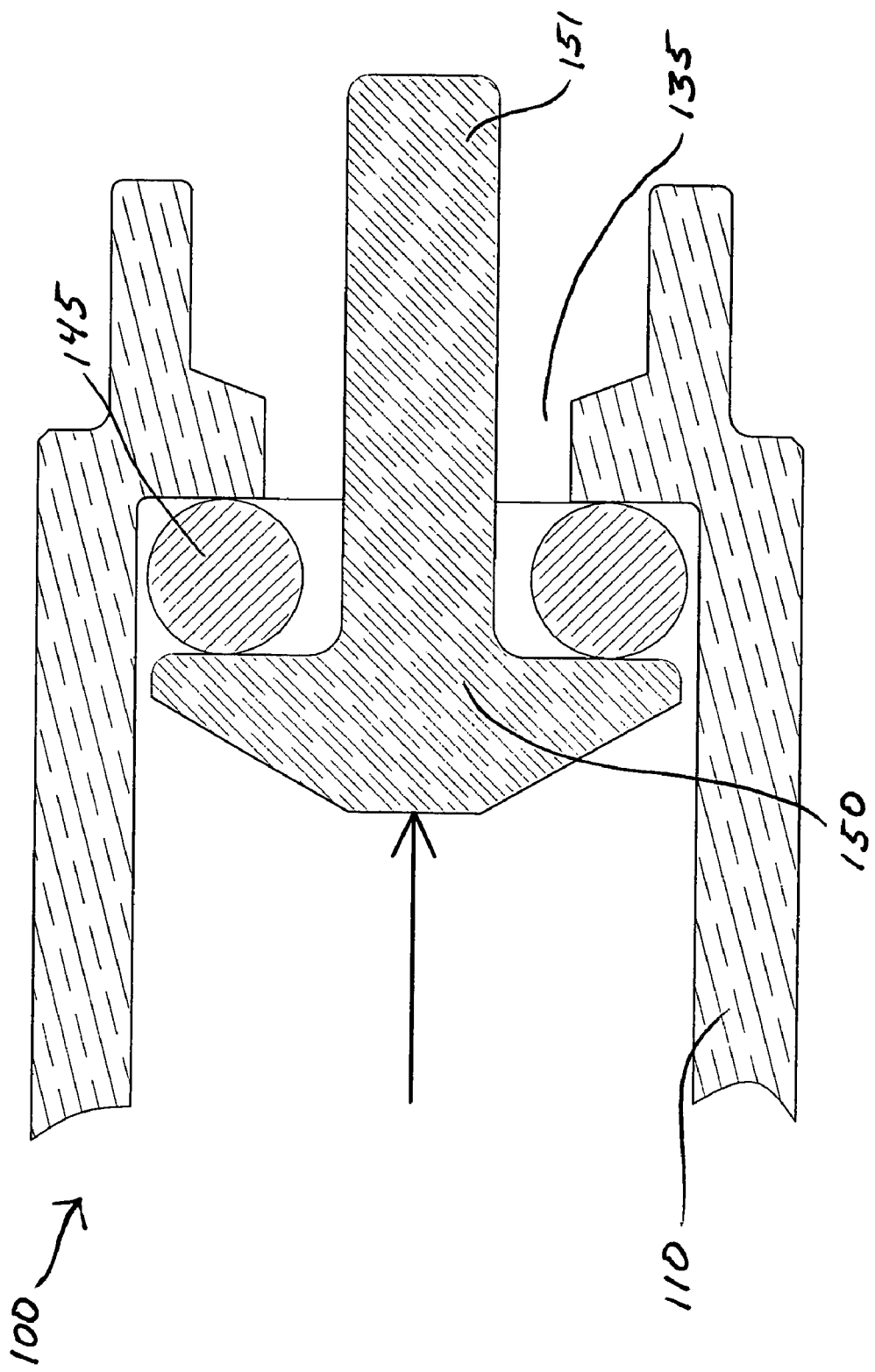
FIG. 1A PRIOR-ART

PRIOR-ART

PRIOR-ART**

PRIOR-ART

PRIOR-ART

PRIOR-ART

NON-AXIAL ACTUABLE VALVE CAPABLE OF RETAINING BOTH HIGH AND LOW PRESSURES

CROSS REFERENCE TO RELATED APPLICATIONS

Not applicable.

FEDERALLY SPONSORED RESEARCH

Not applicable.

REFERENCE TO A MICROFICHE APPENDIX

Not applicable.

FIELD OF THE INVENTION

The present invention relates to improved fluid valves actuable by a non-axial movement of an actuation stem.

BACKGROUND OF THE INVENTION

Several species of prior-art valves are going to be discussed in the background, followed by a summary of why the present invention is novel and improved over the prior-art.

Standard Style Non-Axial Actuable Valve: Summary

FIG. 1A PRIOR-ART illustrates a non-axial actuable valve commonly used in low pressure pneumatic and hydraulic applications; for example used as a dog watering system that attaches to a hose bib on the outside of a home. A dog can drink a clean supply of water from the valve at will while not wasting excess water when not drinking from the valve. The dog watering valve typically utilizes a valve body comprising a bore that has a reduced diameter through-hole at its end. An elastomeric seal, such as having a round or square cross-section seats at the bottom of this bore. A rigid valve element sits on the elastomeric seal thus forming a circumferential sealing surface distally within the valve body bore. A compression spring sits above the rigid valve element and the spring is held in compression by a cap. The rigid valve element also has an actuation stem that protrudes through the reduced diameter through-hole at the end of the valve body that situates circumferentially within the elastomeric sealing surface. This valve is normally closed and fluid typically enters near or through the compression spring cap and is prevented from flowing through the valve by compression of the elastomer seal. The non-axial actuable valve is opened by pivoting the actuation stem generally perpendicular to the valve main axis. A greater pivoting angle from the valve main axis typically provides a higher flow rate through the valve. A dog would typically use its nose or tongue to pivot and actuate this type of valve. Upon removal of the pivoting force from the actuation stem such as when the dog stops drinking from the valve, the compression spring within the valve body will bias the non-axial actuable valve to a closed position. Most dogs quickly learn that by pivoting the actuation stem, water will flow for a refreshing drink. When done drinking, the water flow will cease.

Standard Non-Axial Actuable Valve: Limitations

The elastomeric seal is circumferentially supporting the compression spring preload between the bottom of the valve body and the rigid valve element. Excessive inlet pressure will compress the elastomeric seal proportional to the inlet pressure and the area of the rigid valve element. Illustrated in FIG. 1B PRIOR-ART, elevated inlet pressure makes valve actuation more difficult and will cause the elastomer seal to extrude as it excessively deforms under compression loading. Also, illustrated in FIG. 1C PRIOR-ART, opening the standard non-axial actuable valve while retaining elevated pressure increases the chances that the elastomer seal will extrude right out of the valve body, in whole or in part, thus possibly not allowing the valve to actuate on, actuate off once actuated on, and/or cause elastomeric seal damage. Therefore, the standard non-axial actuable valve works well in low pressure applications that only moderately deform the elastomeric seal and works poorly in elevated pressure applications that excessively deform the elastomeric seal.

Hard Seat Non-Axial Actuable Valve: Summary

Similar in construction of the standard non-axial actuable valve is a non-axial actuable valve that utilizes a harder material as the sealing seat. FIG. 2A PRIOR-ART illustrates a biased closed hard seal non-axial actuable valve. This harder material possesses structural integrity and is not likely to extrude, even under high pressure. Possible seat materials include delrin, Teflon, soft metals, or high durometer urethanes among other possible materials. A higher compressive spring force is required to attempt to fluidly seal a valve that utilizes a hard material seat which also equates into requiring a higher actuation force to overcome the closed position.

Hard Seat Non-Axial Actuable Valve: Limitations

Due to the excessive compressive forces on the hard seat, pivoting actuation force will likely be higher than the valve using an elastomer at its seat. Small amounts of contamination can quickly interfere with a hard seat thus not allowing the valve to completely close, causing a leak failure. A hard seat non-axial actuable valve will minimally compress its seat material upon actuation, even under elevated pressure. Very low pressures are typically not sealed by a hard valve seat. FIG. 2B PRIOR-ART illustrates an actuated open hard seat non-axial actuable valve exhibiting minimal seal material deformation.

Bonded Elastomer Seal Non-Axial Actuable Valve: Summary

Attempts to utilize an elastomer seal that is bonded or captured in place have been practiced and a non-actuated bonded elastomer seal non-axial actuable valve is illustrated in FIG. 3A PRIOR-ART. Adhesives can maintain an elastomer in place either to the valve body or to the rigid valve element. Likewise, an elastomer seal having a more complex shape can be captured to a valve body or captured within a multi-piece rigid valve element. Rapid actuation of a non-axial actuable valve having a bonded elastomer in place will not likely extrude the seal out of position within the valve.

Bonded Elastomer Seal Non-Axial Actuable Valve: Limitations

Either an additional elastomer bonding process must be practiced, thus increasing manufacturing costs, or a special shaped elastomer and/or valve seat(s) need to be made that are capable of capturing part of this seal in place thus maintain the seal into position. Any of these bonding or securing methods do create an overall more complex non-axial actuable valve assembly also increasing cost. Containment pressure capabilities for a bonded elastomer seal non-axial actuable valve are similar to those of the standard non-axial actuable valve, yet chances for elastomeric seal extrusion are considerably minimized. FIG. 3B PRIOR-ART illustrates a bonded elastomer seal non-axial actuable valve in an actuated open position. In addition to higher cost and potential failure of the seal bond or containment method, exposure to chemicals, heat, or other potential failure modes such as high pressure can cause failure of the seal retaining means.

The non-axial actuable valve taught in the embodiments of the present invention will improve upon the aforementioned limitations of the prior-art. Each embodiment is designed to be actuated by a pivoting action on its actuation stem. This pivoting action will fulcrum about one or more valve components and the actuation force can deviate from true perpendicular to the valve main axis so long as the pivot force (perpendicular) component can overcome the closed forces. Also, each embodiment self-resets to a closed position when not acted upon by external actuation forces.

This invention solves a long felt need for a valve that is simple by design, inexpensive to manufacture, and capable of handling both high and low operating pressures equally well. Other non-axial actuable valves are a rare find in hardware catalogs. One lucky enough to find a commercially available non-axial actuable valve will quickly find that manufacturers consistently limit the maximum operating pressure to the low hundred psi pressure range, such as 200 psig maximum, or considerably less.

In fact, Inventor searched near and far for such a non-axial actuable valve that could maintain low input pressure as well as reliably operate under high inlet pressure. After much research, it became apparent that no manufacturers made such a valve that could handle inlet pressures operable to thousands of psig before failing and capable of opening through non-linear actuation while also sealing at 0 psig or substantially 0 psig.

The non-linear actuable valves embodied in the present invention maintain pressure containment through a novel approach over the prior-art. The exemplary embodiments teach improved non-linear actuable valves that reduce the chances for seal extrusion, particularly at elevated retaining pressure, while keeping the component count low, and are capable of functioning under both high and low pressure.

The following embodiments will describe the present invention as well as exemplify the preferred embodiment. Additionally, with the aid of figures and an understanding of the prior-art, one having ordinary skill in the art will be able to understand and appreciate the gained utility from the embodiments to follow.

OBJECTS AND ADVANTAGES

Accordingly, several objects and advantages of the present invention will be presented in the following paragraphs followed by a thorough disclosure of each aspect in the accompanying embodiments in the DETAILED DESCRIPTION.

In light of the above-mentioned limitations, it is therefore an object of the present invention to teach non-axial actuable valve designs that will allow the valve embodiments to operate at both low and high operating pressures.

It is another object of the present invention to provide a non-axial actuable fluid pressure valve that self-resets to the closed position, when subjected to elevated operating pressure or no inlet pressure.

Another object of the present invention is to teach non-axial actuable valve designs capable of actuation without seal extrusion, regardless of the actuation rate or reasonable operation temperature.

Another object of the present invention is to minimize the parts count thus allowing for simplified, easy to manufacture assembly, reducing labor cost, which yields an affordable yet reliable valve.

While maintaining the causative principle of the invention, it is another object of the present invention to have similar components manufactured from machined, molded, or other manufacturing method to suit the intended valve specification.

Another object of the present invention is to allow non-axial valve opening actuation from a wide range of directions.

Additionally, an object of the present invention is to teach a non-axial actuable valve design capable of operation in miniature.

As well, an object of the present invention is to teach a non-axial actuable valve design that is capable of operation in large scale.

Further objects and advantages will become apparent in the following paragraphs. Solely and in combination, the above objects and advantages will be illustrated in the exemplary figures and accompanying embodiments to follow.

BRIEF DESCRIPTION OF THE DRAWINGS

The figures are exemplary of different embodiments of the present invention. Each illustration conveys the invention and is not to be considered as limiting, rather, exemplary to the scope and causative principle of the present invention. Like components in the figures share identical numbering.

FIG. 1A PRIOR-ART illustrates a side section view of an exemplary standard non-axial actuable valve in a closed position retaining little or no pressure;

DETAILED DESCRIPTION

The following paragraphs will detail several modes including the best mode of the present invention. The exemplary figures and description of the invention as it is exemplified in each figure is representative of the current invention and the scope of the invention disclosure is not intended to be limited by the exemplary teachings. One skilled in the pertinent art realizes that the embodiments to follow may reasonably be combined and/or modified without deviating from the intended spirit of the present invention. Like physical structure in different figures share the same identifying numbers.

Figure 4A:
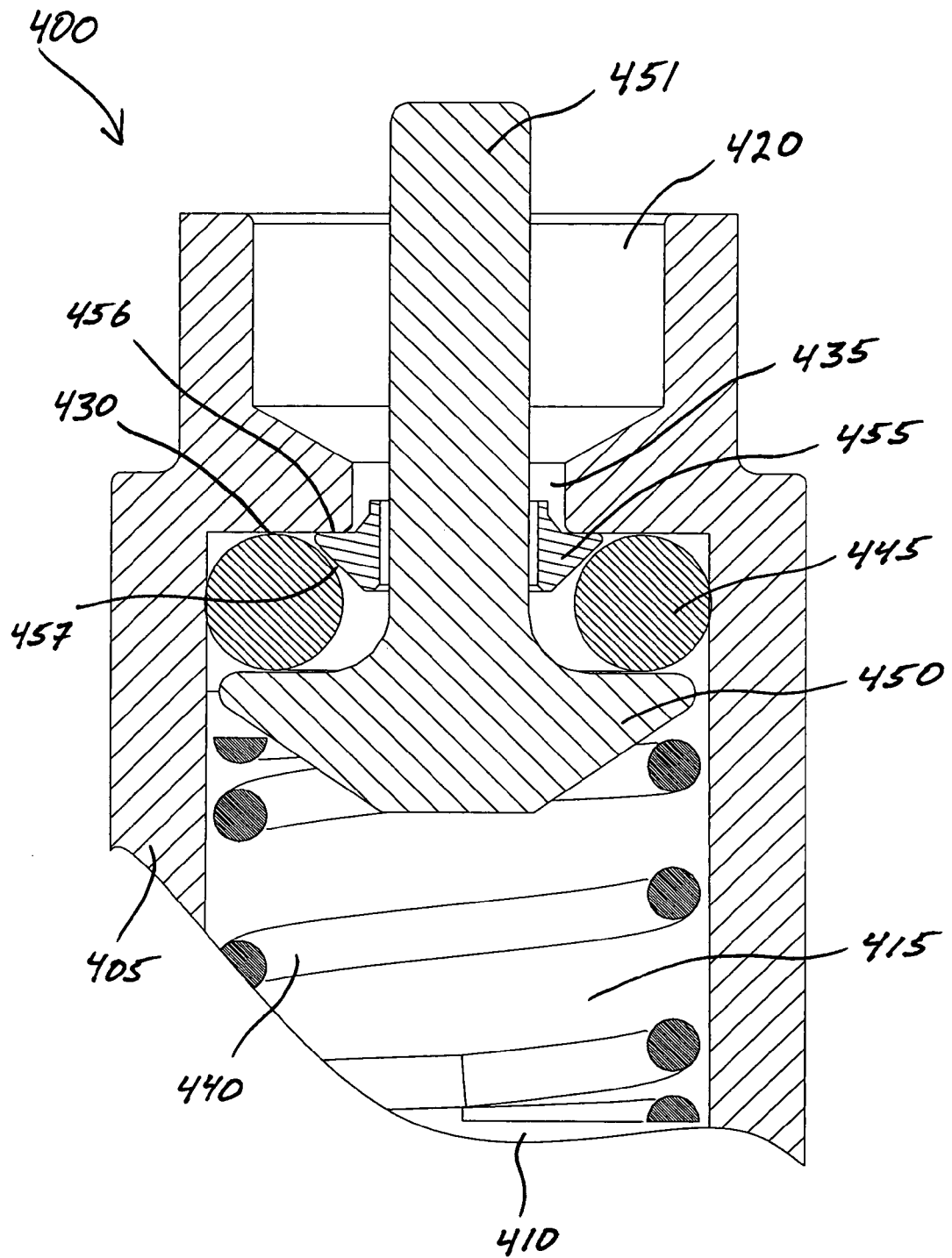
FIG. 4A illustrates a side section view of an exemplary non-axial actuable valve retaining little or no pressure, incorporating an elastomeric seal support ring about the base of the actuation stem, in accordance with an embodiment of the present invention.

In accordance with an embodiment of the invention, FIG. 4A illustrates an exemplary non-axial actuable valve 400 subjected to little or no pressure, in accordance with the claimed invention. A valve body 405 is illustrated having a first end 410, a high pressure zone 415, and a second end 420. Valve body first end 410 is intentionally shown truncated. One skilled in the pertinent art can readily understand that valve body first end 410 can fluidly attach via mechanical connection such as a threaded connection to an upstream pressure source or could equally be integrated into a pressure vessel.

High pressure zone 415 is embodied as a bore having a flat bottom that becomes a sealing valve seat 430. A reduced diameter through hole 435 is bored through valve seat 430 and continues a fluid connection between high pressure zone 415 and second end 420.

Similar to the possible attachments stated for first end 410, second end 420 can easily be plumbed to a downstream device, vented to the atmosphere, etc. Second end 420 is illustrated without any specific connection means for sake of simplicity.

The internal components embodied in non-axial actuable valve 400 include a compression spring 440, a seal 445, a rocker seat 450, and a floating seal support 455.

Compression spring 440 distally centers along the distal tapered edge of rocker seat 450 and is retained about its other end by a mechanical means such as a spring retaining cap, potentially adjustable, and not illustrated for simplicity. Embodied non-axial actuable valve 400 is normally biased to a closed position. Floating seal support 455 situates about an actuation stem 451 that integrates into rocker seat 450. There is diametrical clearance between through hole 435 and floating seal support 455 and a circumferential lip for floating seal support 456 that abuts to sealing valve seat 430, thus preventing floating seal support 455 from passing through reduced diameter through hole 435. Additionally, there is diametrical clearance between actuation stem 451 and floating seal support 455 to allow for flow without extrusion. Floating seal support 455 embodies a seal backup face 457. The benefits of seal backup face 457 will be realized in FIGS. 4B and 4C. Seal 445 is preferably, and illustrated as an o-ring. Other shapes of seals are also capable of a variety of shapes and one skilled in the pertinent art realizes that material selection and durometer or hardness specification can vary widely, dependent upon intended use of the non-axial actuable valve 400.

Figure 1B:
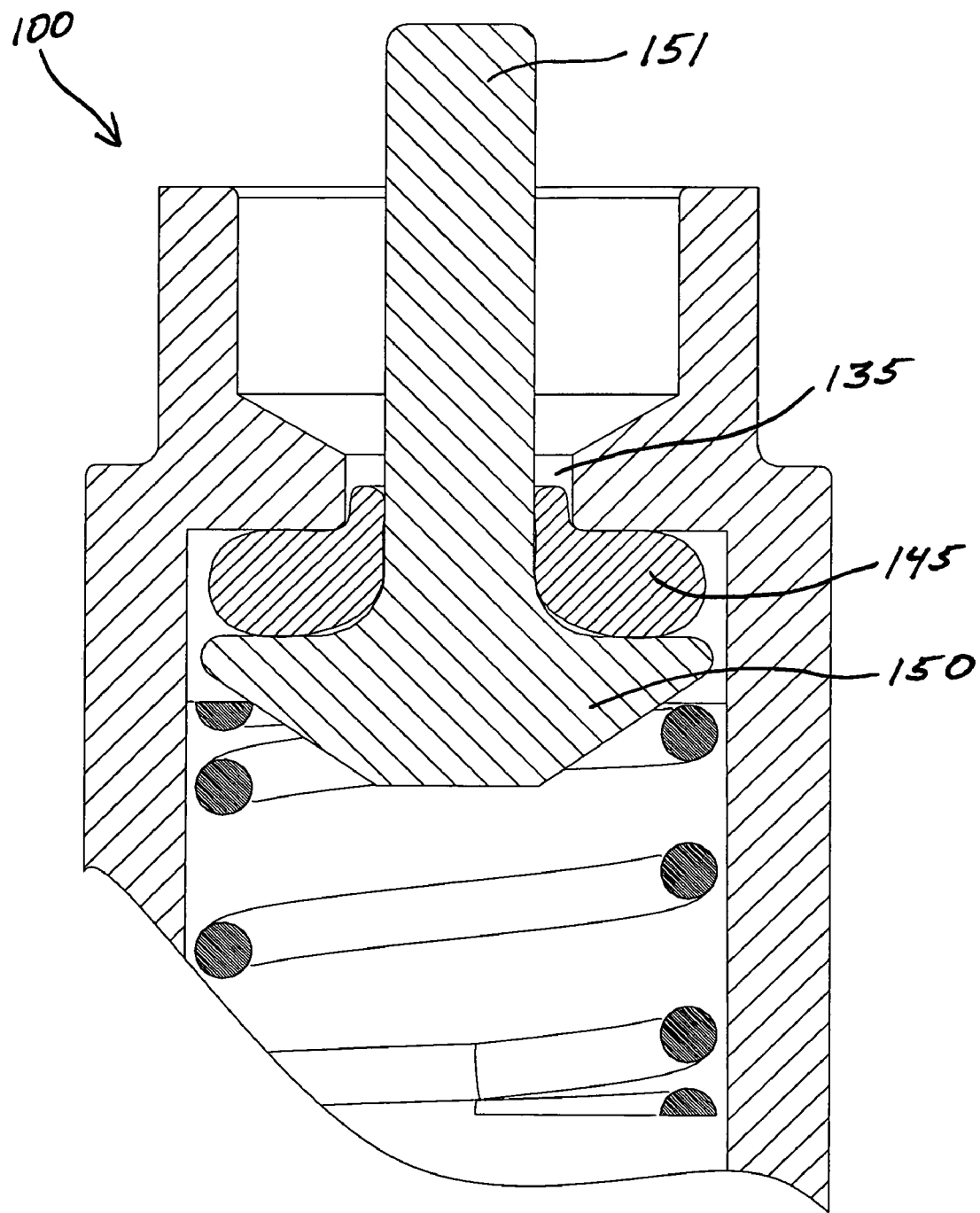
FIG. 1B PRIOR-ART illustrates a side section view of an exemplary standard non-axial actuable valve from FIG. 1A PRIOR-ART in a closed position retaining elevated pressure.
Figure 1C:
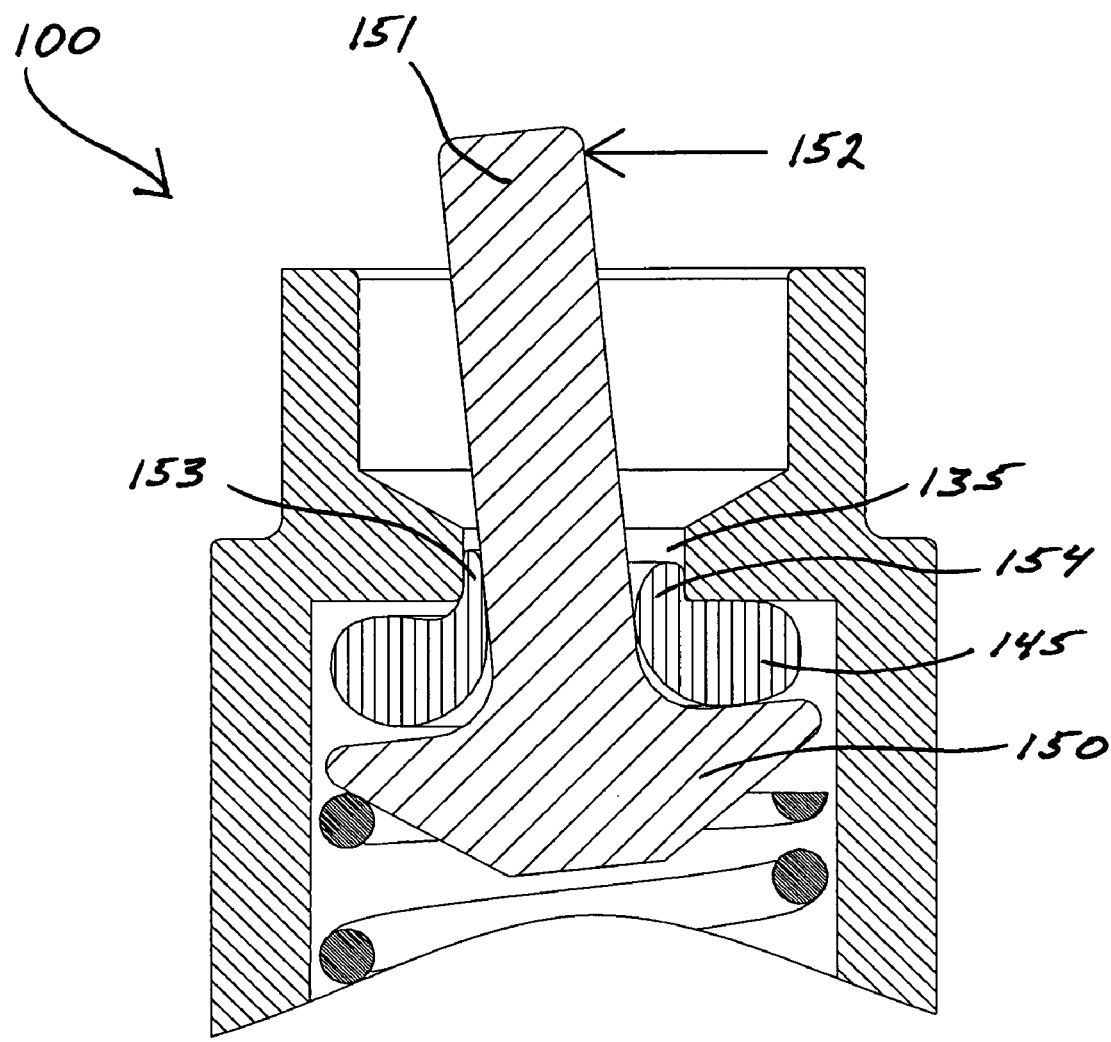
FIG. 1C PRIOR-ART illustrates a side section view of an exemplary standard non-axial actuable valve from FIG. 1A PRIOR-ART in an actuated open position while retaining elevated pressure.
Figure 2A:
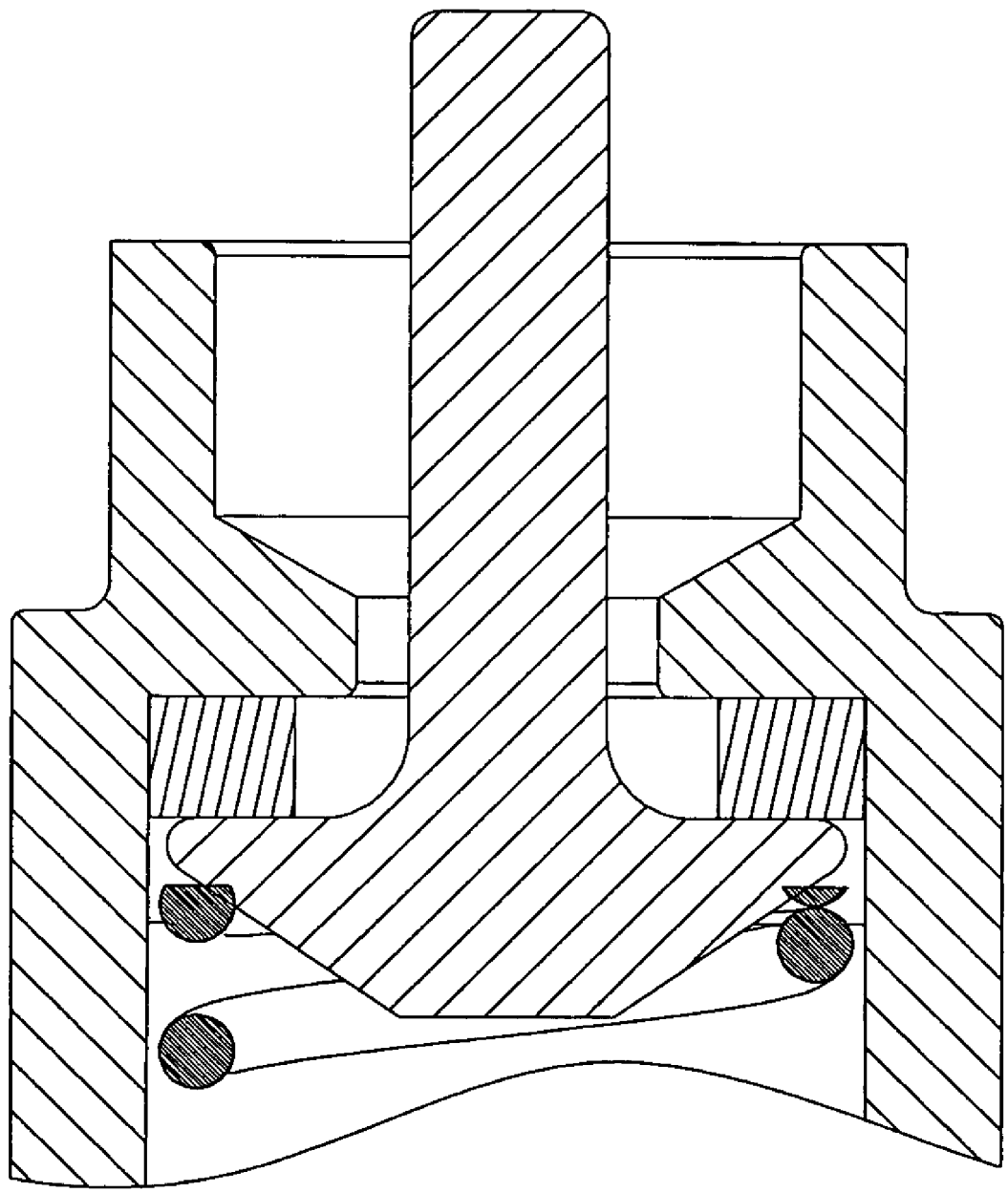
FIG. 2A PRIOR-ART illustrates a side sectional view of a hard seat non-axial actuable valve retaining high inlet pressure.
Figure 2B:
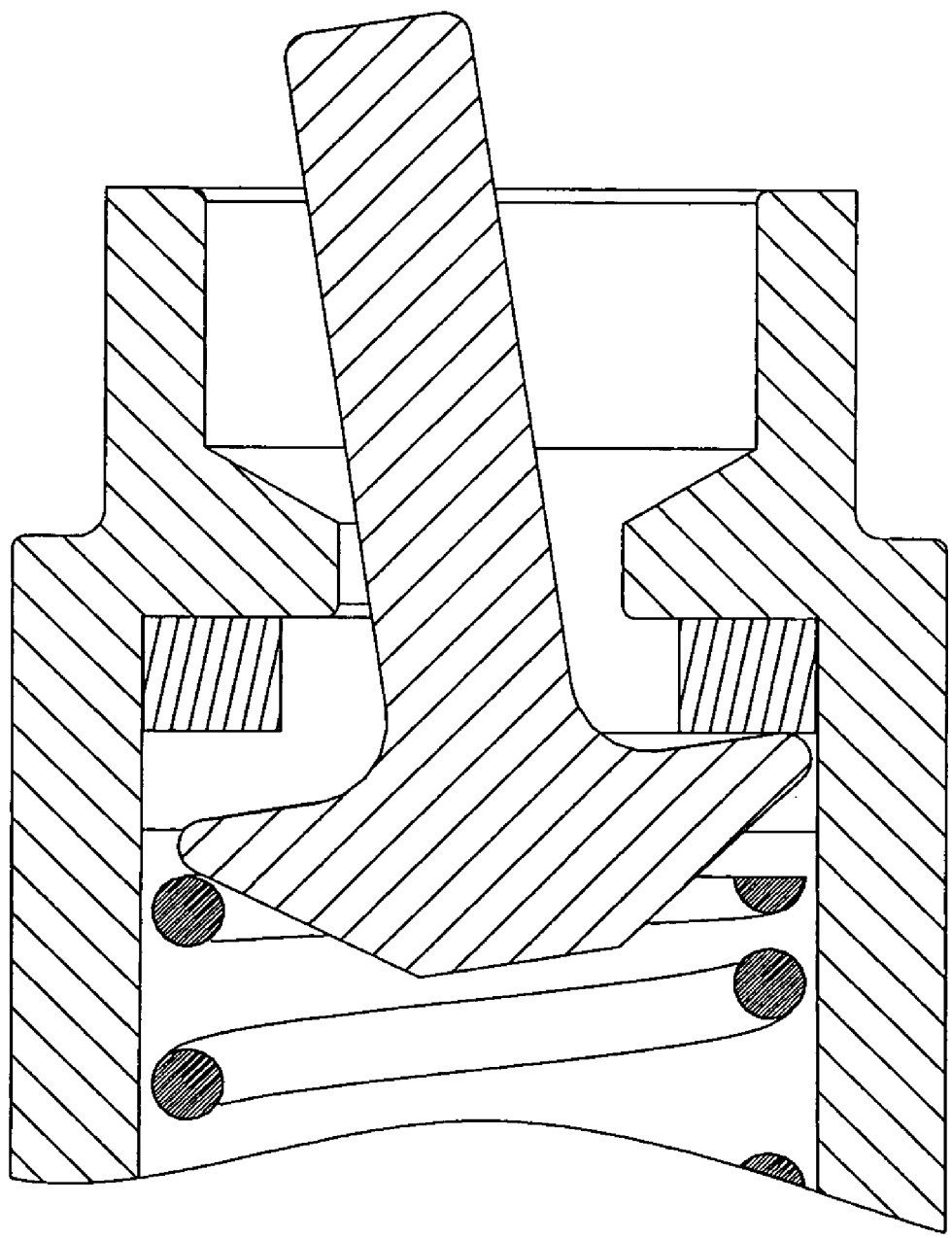
FIG. 2B PRIOR-ART illustrates a side sectional view of the hard seat non-axial actuable valve from FIG. 2A PRIOR-ART in an actuated open position.
Figure 3A:
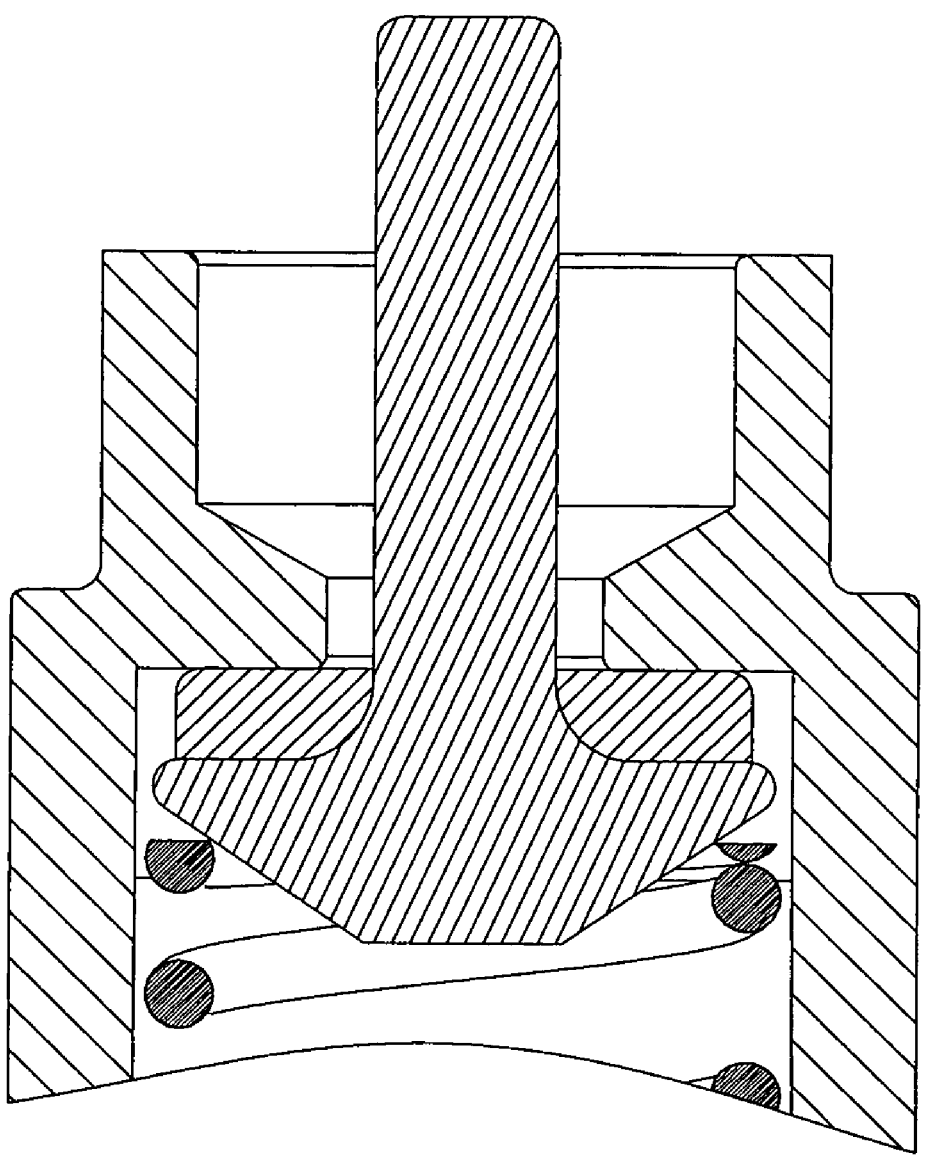
FIG. 3A PRIOR-ART illustrates a side sectional view of a non-axial actuable valve in a closed position that has an elastomeric seal support integrated into the valve body seat.
Figure 3B:
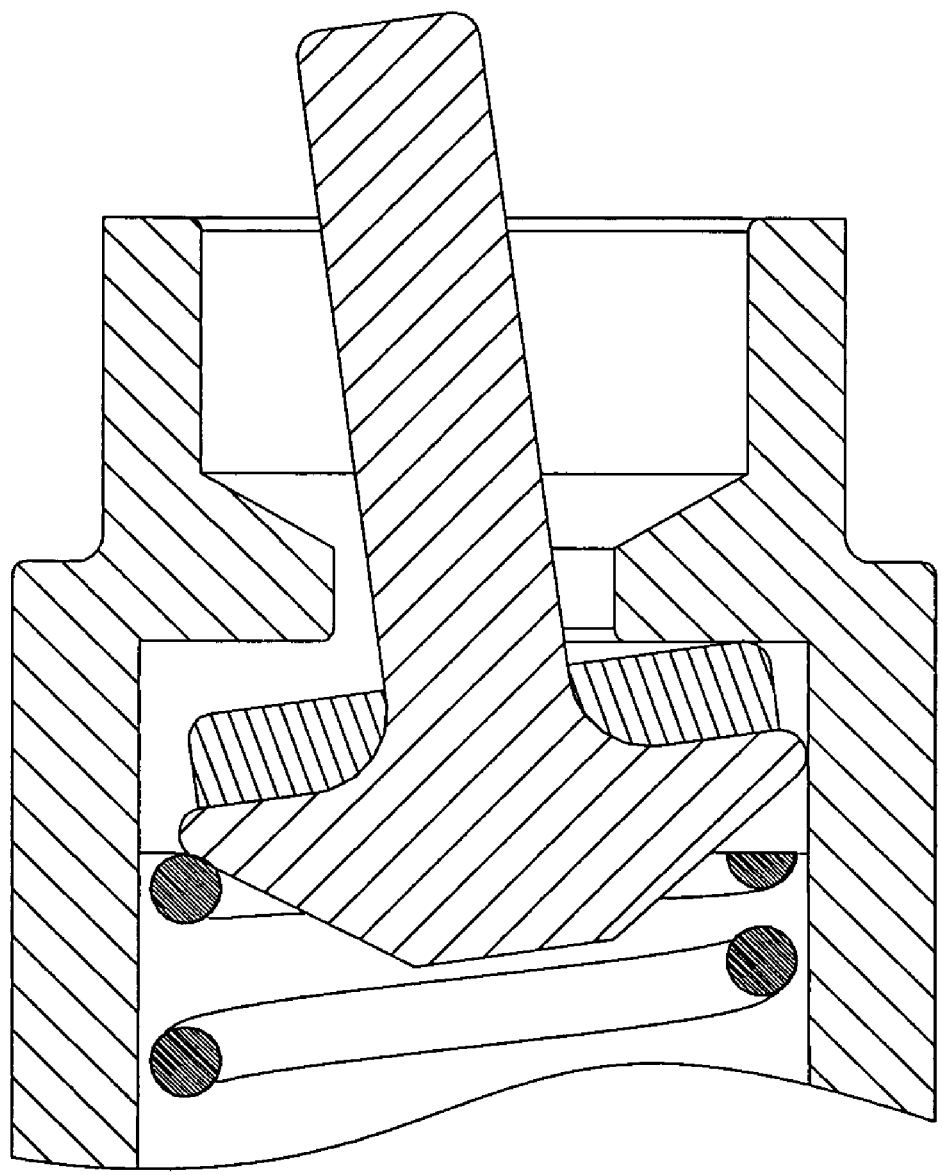
FIG. 3B PRIOR-ART illustrates a side sectional view of the non-axial actuable valve from FIG. 3A PRIOR-ART in an actuated open position.
Figure 4B:
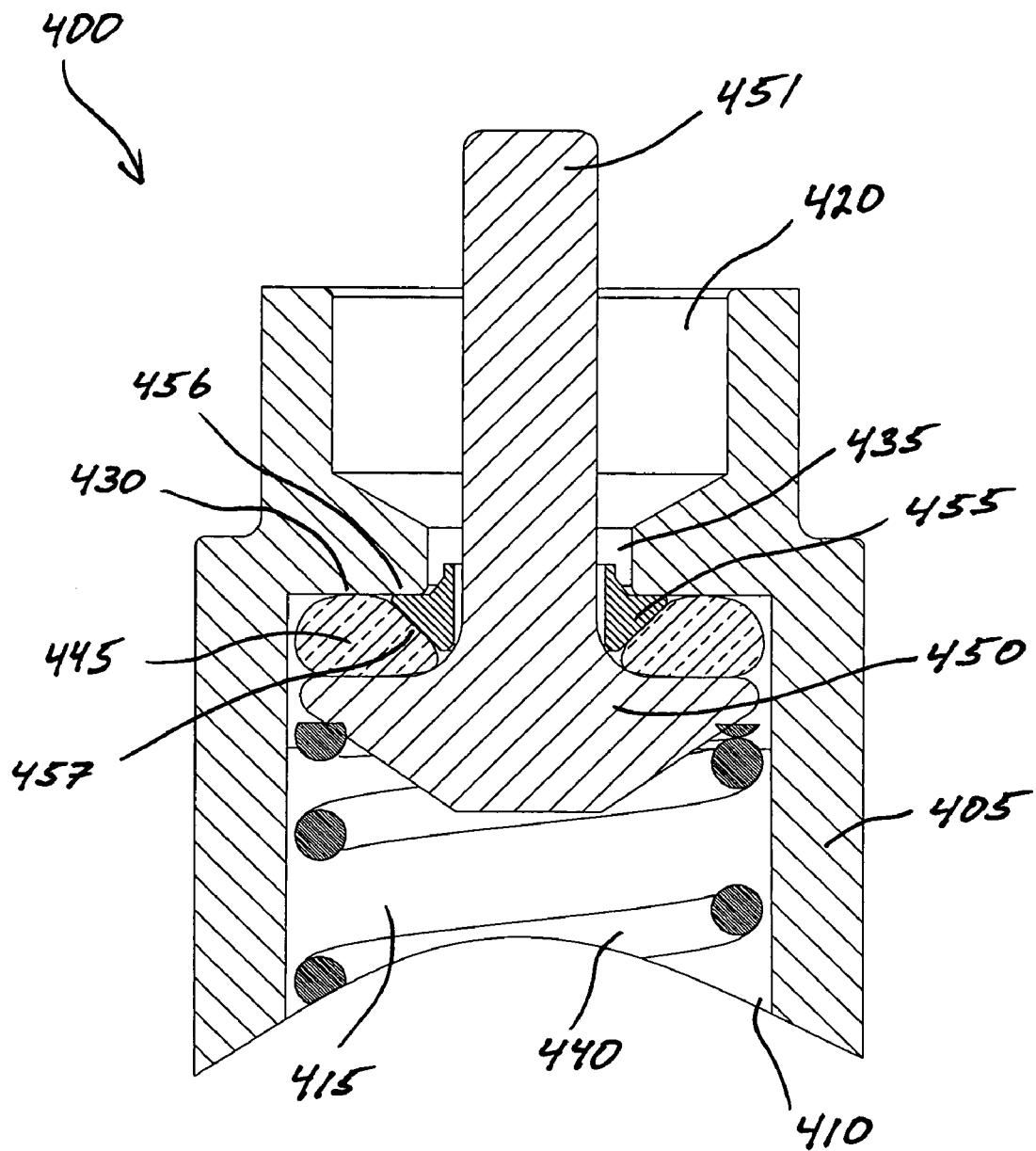
FIG. 4B illustrates a side section view of the non-axial actuable valve from FIG. 4A retaining high pressure, in accordance with an embodiment of the present invention.
Figure 4C:
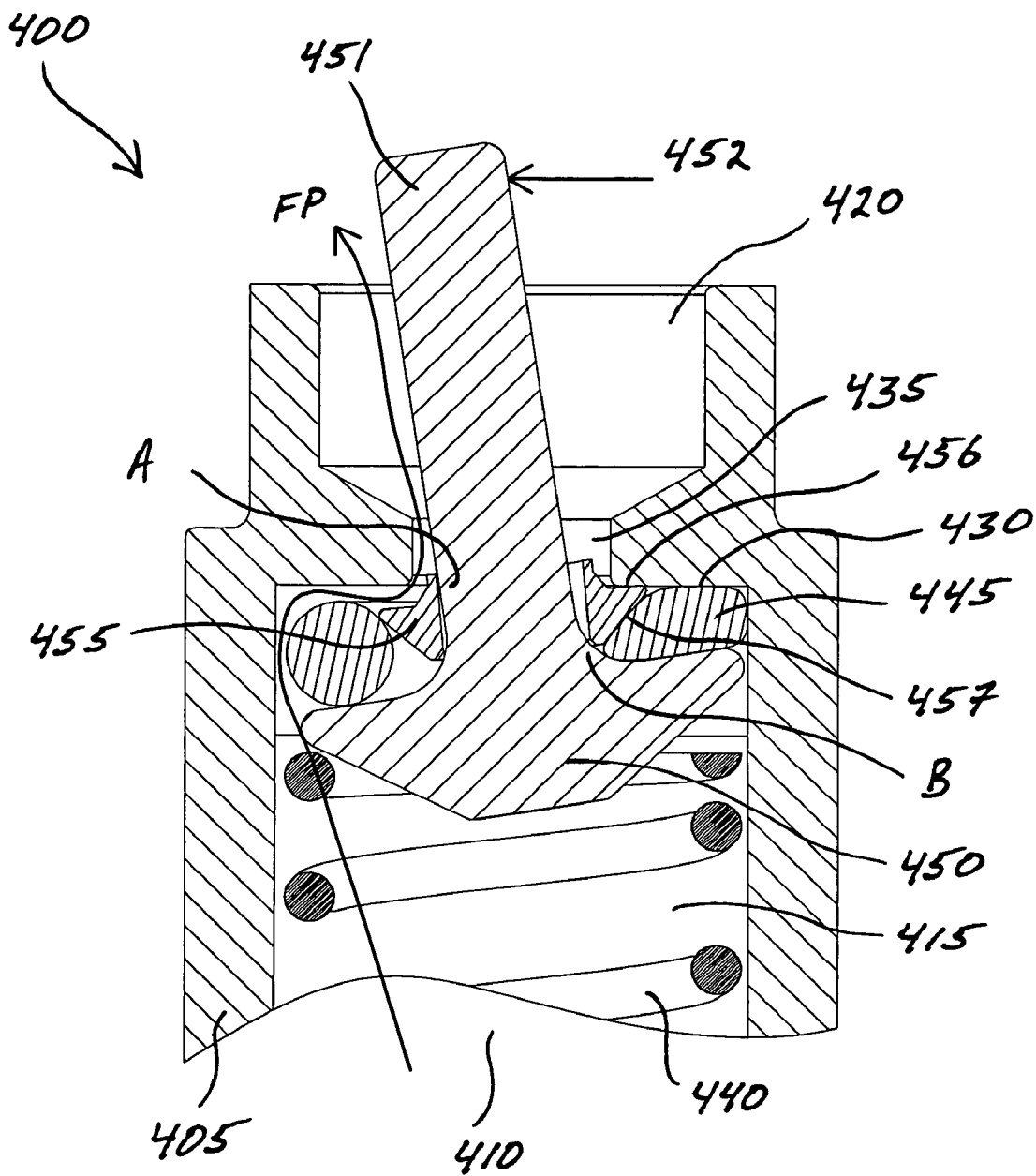
FIG. 4C illustrates a side section view of the non-axial actuable valve from FIG. 4A in an actuated open position, in accordance with an embodiment of the present invention.

The standard non-axial actuable valve of FIGS. 1A-1C PRIOR-ART, initially described in the BACKGROUND section, are much more likely to allow an elastomeric seal to extrude into its through hole (comparable to through hole 435 from FIGS. 4A-4C). This is mainly because a standard non-axial actuable valve provides no elastomer support means at this critical location which becomes particularly important as temperatures increase, seal durometer decreases, and/or retaining pressure increases.

Illustrated in FIG. 1B PRIOR-ART is a typical standard non-axial actuable valve subjected to an elevated retaining pressure. An elastomeric seal 145 lacks adequate support around a through hole 135 and has a tendency to extrude into through hole 135, particularly as pressure and/or temperatures increase.

Problems cascade upon an actuation 152 of the PRIOR-ART standard non-axial actuable valve as illustrated in FIG. 1C. Elastomeric seal 145 becomes trapped between through hole 135 and actuation stem 151 at a pinch point 153. Pinch point 153 usually will harm an elastomeric seal such that eventual failure is inevitable, possibly after just one actuation cycle. Additionally, actuation 152 does allow for a large gap 154 necessary for flow, opposite pinch point 153 of through hole 135 creating a wide portion for seal extrusion. Variables such as operating temperature, viscosity and/or lubricity of fluid within the valve, elastomer seal material and durometer, operating pressure, rate of actuation, etc. can lead to complete or substantial seal extrusion through large gap 154. If seal extrusion were to occur, the PRIOR-ART standard non-axial actuable valve from FIGS. 1A-1C would not close correctly and would certainly leak.

FIG. 4B illustrates a side section view of non-axial actuable style valve 400 from FIG. 4A retaining high pressure, in accordance with an embodiment of the present invention. Rocker seat 450 is axially shifted toward sealing valve seat 430 due to compression of elastomeric seal 445. Floating seal support 455 provides support for compressed elastomeric seal 445 through circumferential lip for floating seal support 456 and prevents seal extrusion into through hole 435.

FIG. 4C illustrates a side section view of non-axial actuable valve 400 from FIG. 4A in an actuated open position, in accordance with an embodiment of the present invention. An actuation force 452 upon actuation stem 451 has a tendency to shift seal support 455 to the edge of through hole 435 in the same direction as actuation force 452, yet still provide support for elastomeric seal 445 about seal backup face 457, minimizing and/or eliminating seal extrusion into through hole 435. A flow path FP is illustrated as a curvy arrow to represent a two-dimensional flow path for an actuated open valve. If actuation force 452 is great enough in magnitude upon actuation stem 451, seal support 455 can bind about actuation stem at a binding point A and a binding point B. This binding can allow seal support 455 to partially lift away from sealing valve seat 430 thus also partially lifting elastomeric seal 445 to increase the flow capacity of non-axial actuable valve 400. Subtleties to design geometry will affect the degree of potential binding as a function of actuation angle at A and B on seal support 455, if any. At any angle in the tilt range of actuation stem 451 wherein valve 400 is actuated open, the causative principle of the invention incorporates a non-sealable condition on a portion between valve seat 430, seal support 455, and rocker seat 450 thus allowing fluid to exit valve second end 420 while not creating a substantial gap allowing for seal extrusion.

Figure 5A:
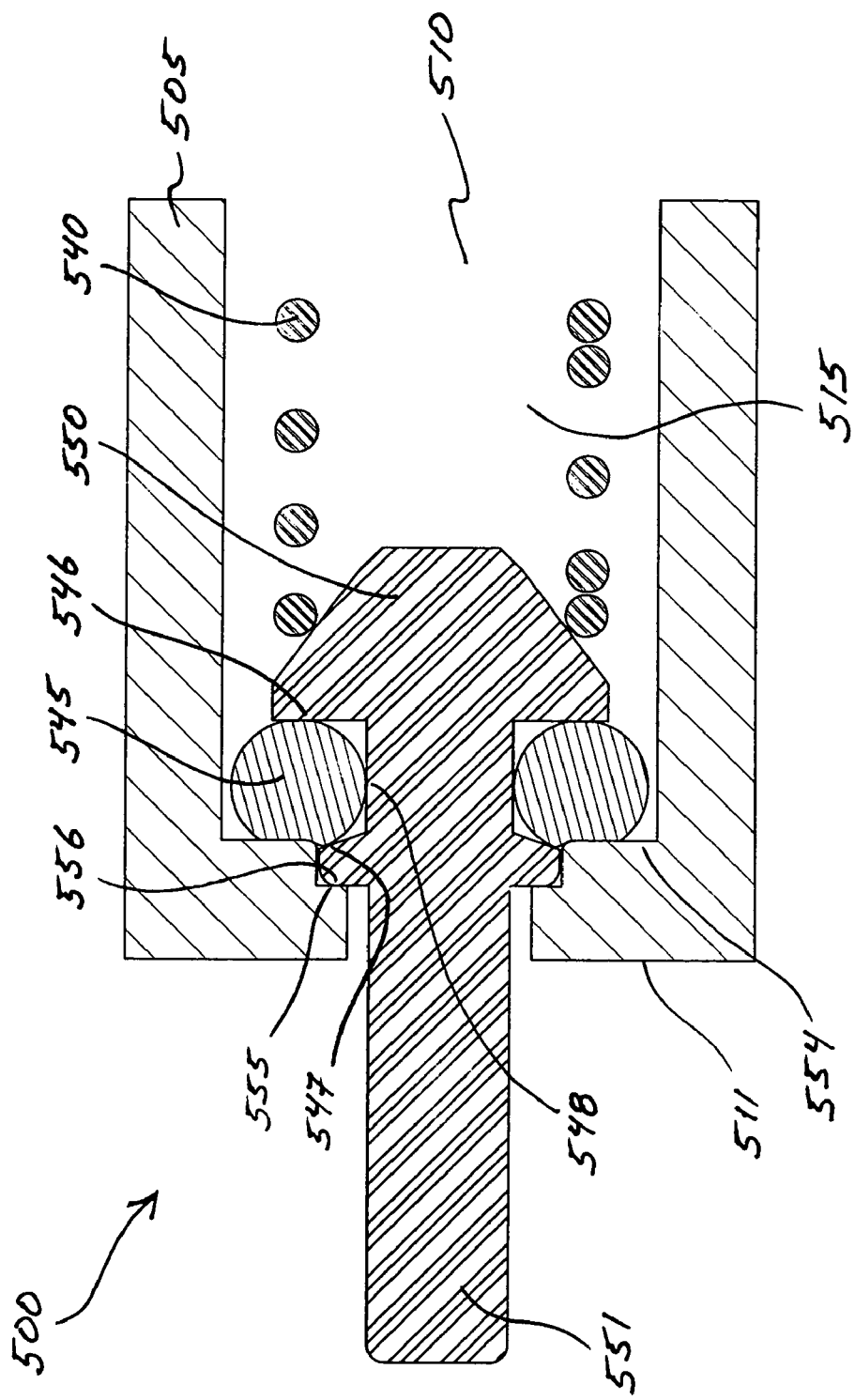
FIG. 5A illustrates a side sectional view of an exemplary non-axial actuable valve having a rigid stop and in a closed position, in accordance with an embodiment of the present invention.

FIG. 5A illustrates a side sectional view of an exemplary non-axial actuable valve 500 having a rigid stop and in a closed position, in accordance with an embodiment of the present invention. A valve body 505 is illustrated having a first end 510 shown simplified for clarity that is fluidly connected to a pressure source. One skilled in the pertinent art can readily understand that valve body first end 510 can fluidly attach via a threaded or other mechanical connection to an upstream pressure source or could equally be integrated into a pressure vessel. A high pressure zone 515 is embodied generally as a bore in valve body 505 and is contained by a seal 545 that is held into place by a first end lip 546, a second end lip 547, and a seal root portion 548, defined as features integrated into rocker element 550, and a valve seat 554. Rocker element 550 has an annular ring 556 that abuts to a recessed annular groove 555 in valve body 505 and has an actuation stem 551 protruding out the end of valve body 505 to define a second end 520. Annular groove 555 centers rocker element 550 within valve body 505. A compression spring 540 biases valve 500 to a normally closed position.

By design, seal 545 is only partially compressed in closed valve 500. A higher durometer elastomeric seal may require spring 540 to provide a higher compressive force and/or component geometry can be adjusted without deviating from the scope of the embodiment. One having ordinary skill in the art could easily experiment to find an optimum range to meet their needed design criteria.

Figure 5B:
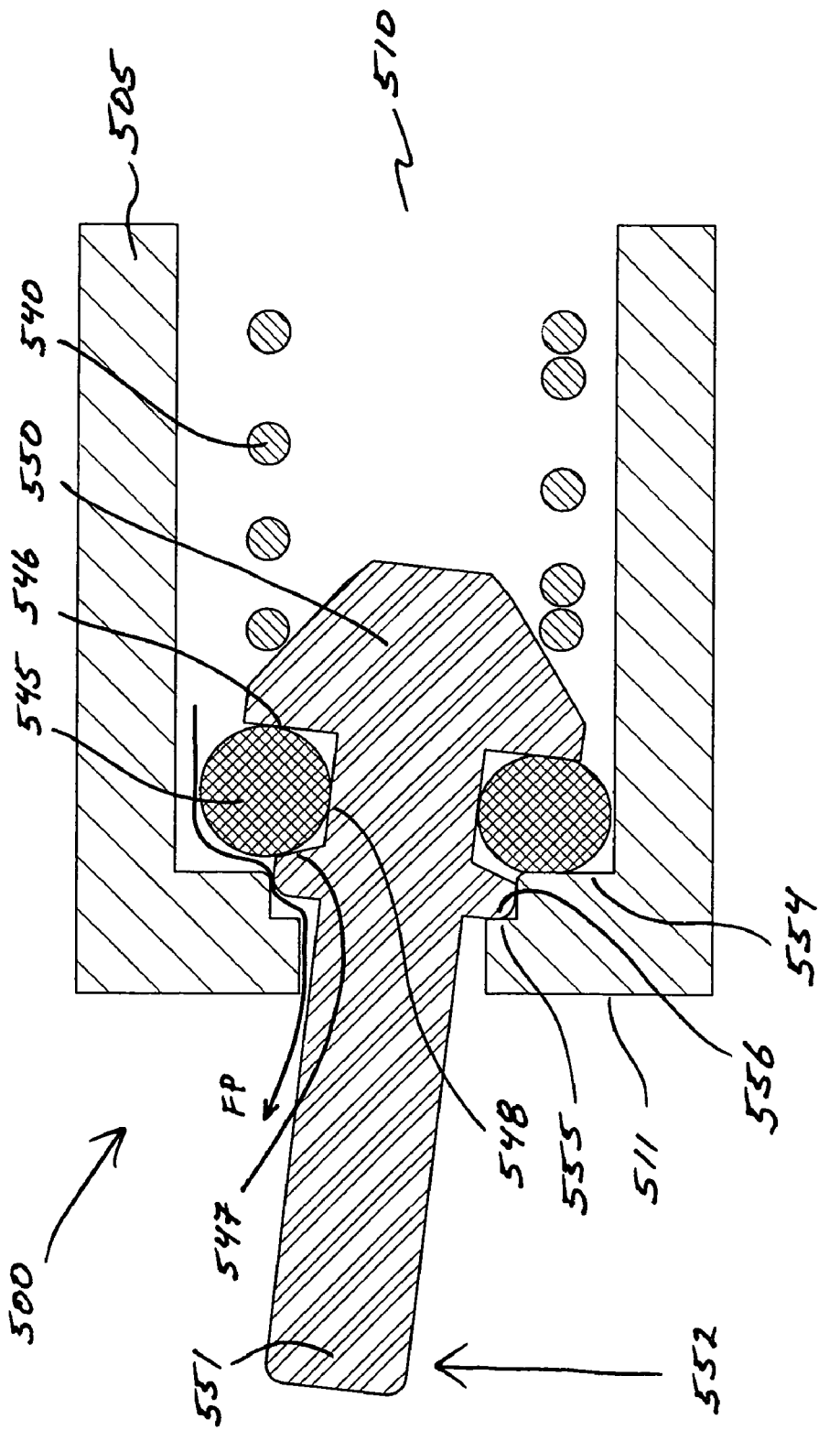
FIG. 5B illustrates a side sectional view of the non-axial actuable valve from FIG. 5A in an actuated open position, in accordance with an embodiment of the present invention.

FIG. 5B illustrates a side cross-section view of rigid stop non-axially actuable valve 500 in a pivoted open position, in accordance with an embodiment of the present invention. A rocking force 552 acting on actuation stem 551 pivots rocker element 550 about a portion of annular groove 555 and annular ring 556. A flow path FP is created and fluid is allowed to pass through valve 500. In the event that seal 545 is made from a high durometer material and potentially also incorporating design geometry, annular ring 556 may lift off of annular groove 555 at higher pivot angles of actuation stem 551. At any angle in the tilt range of actuation stem 551 wherein valve 500 is actuated open, the causative principle of the invention incorporates a non-sealable condition on a portion between valve seat 554 and seal 545, thus allowing fluid to exit valve second end 520 while not creating a substantial gap allowing for seal extrusion.

Figure 6A:
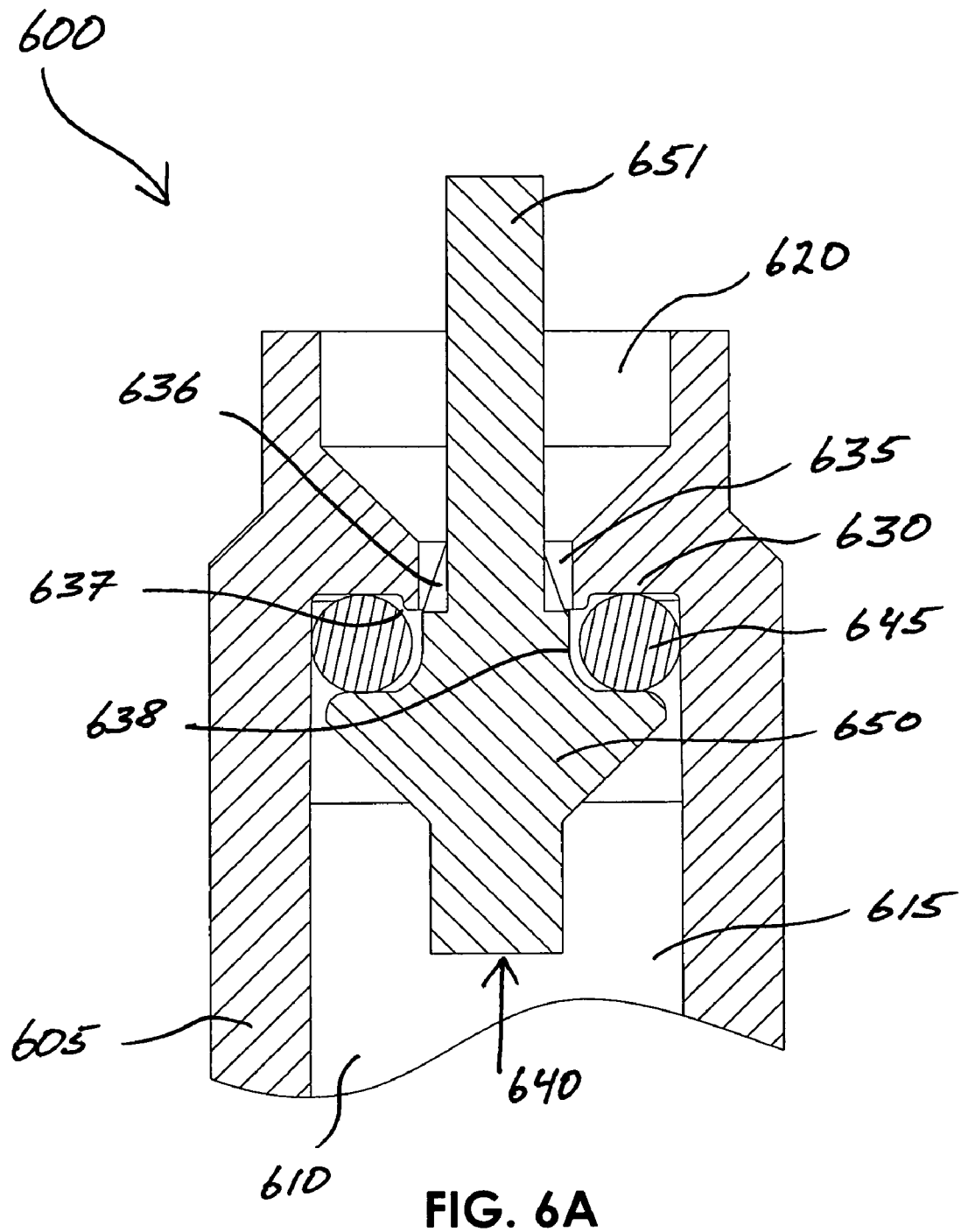
FIG. 6A illustrates a side sectional view of an exemplary non-axial actuable valve in a closed position having integrated vents into its actuation stem, in accordance with an embodiment of the present invention.

In accordance with an embodiment of the present invention, FIG. 6A illustrates a side cross-section view of an exemplary non-axially actuable valve 600 exemplified in a closed position. A valve body 605 is illustrated having a first end 610 shown simplified for clarity that is fluidly connected to a pressure source. One skilled in the pertinent art can readily understand that valve body first end 610 can fluidly attach via a threaded or other mechanical connection to an upstream pressure source or could equally be integrated into a pressure vessel. A high pressure zone 615 is embodied generally as a bore in valve body 605 and is contained by a seal 645 that is held into place by a rocker element 650 that is biased toward a valve seat 630 by a compression spring 640. Valve seat 630 additionally features a circumferential seal lip 637 and the benefits of circumferential seal lip 637 will be clarified in FIGS. 6D and 6E. An actuation stem 651 is embodied as an integrated protrusion from rocker element 650 and protrudes out of a valve body second end 620. Rocker element 650 also comprises a plurality of supportive vent ribs 636 circumferentially oriented about actuation stem 651 and situated substantially within a valve body through hole 635. Supportive vent ribs 636 taper to the diameter of actuation stem 651 as they protrude toward valve body second end 620. Supportive vent ribs 636 taper to the diameter of a rocker element alignment portion 638 that is capable of slidably fitting into valve body through hole 635 with no interference. These smooth vent transitions to actuation stem 651 and rocker element alignment portion 638 prevent binding of rocker element 650 as will become evident in FIGS. 6D and 6E that exemplify non-axially actuable valve 600 in a pivoted open position.

Figure 6B:
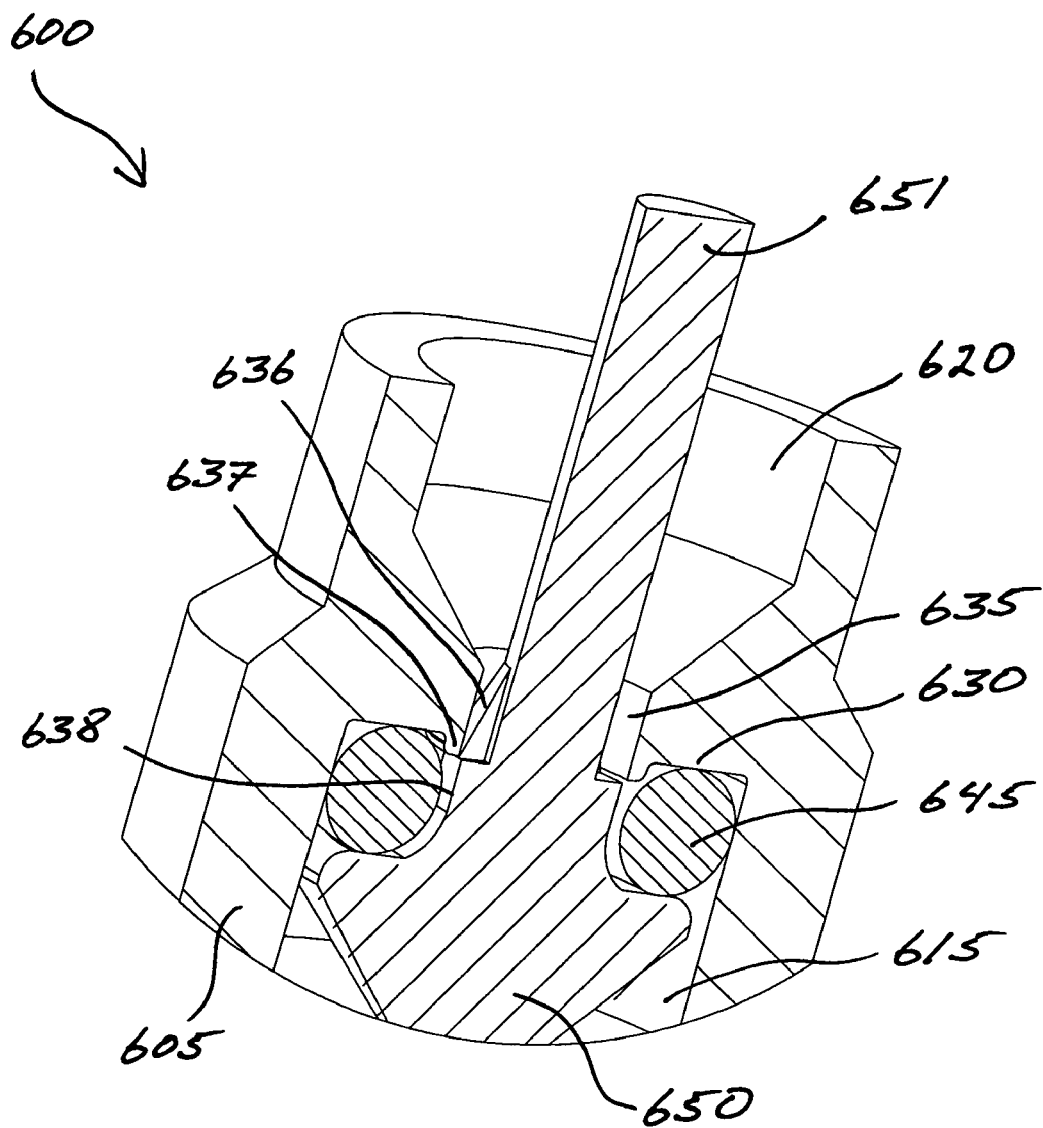
FIG. 6B illustrates an isometric section view of the embodied non-axial actuable valve from FIG. 6A.
Figure 6C:
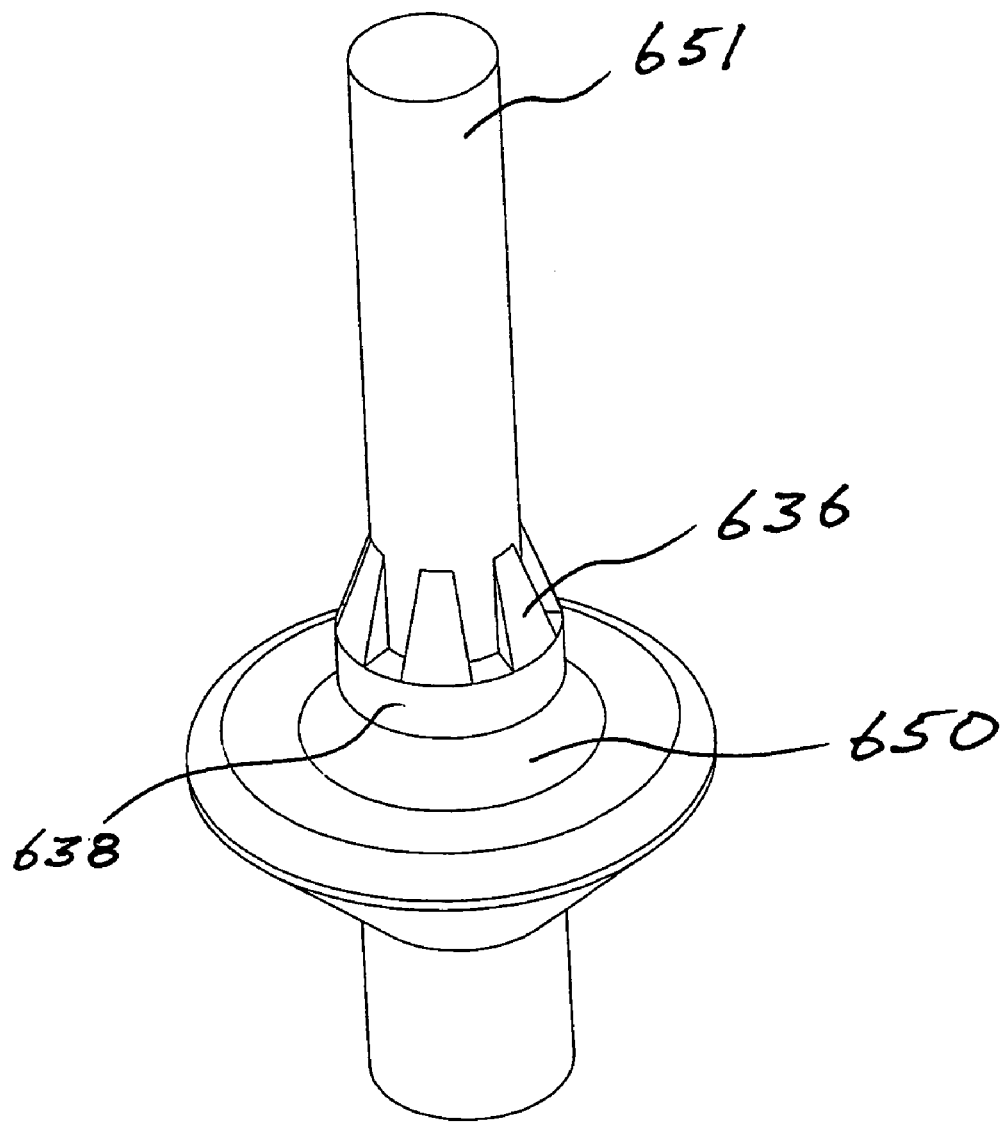
FIG. 6C illustrates an isometric view of the flow stopper from the embodiment of FIG. 6A detailing integrated vents in the actuation stem, in accordance with an embodiment of the present invention.

FIG. 6B illustrates an isometric cross-section view of non-axially actuable valve 600 in a closed position, particularly intended to exemplify supportive vent ribs 636. And exemplified in FIG. 6C is embodied rocker element 650, actuation stem 651, and supportive vent ribs 636 shown without any other valve components to increase clarity.

Figure 6D:
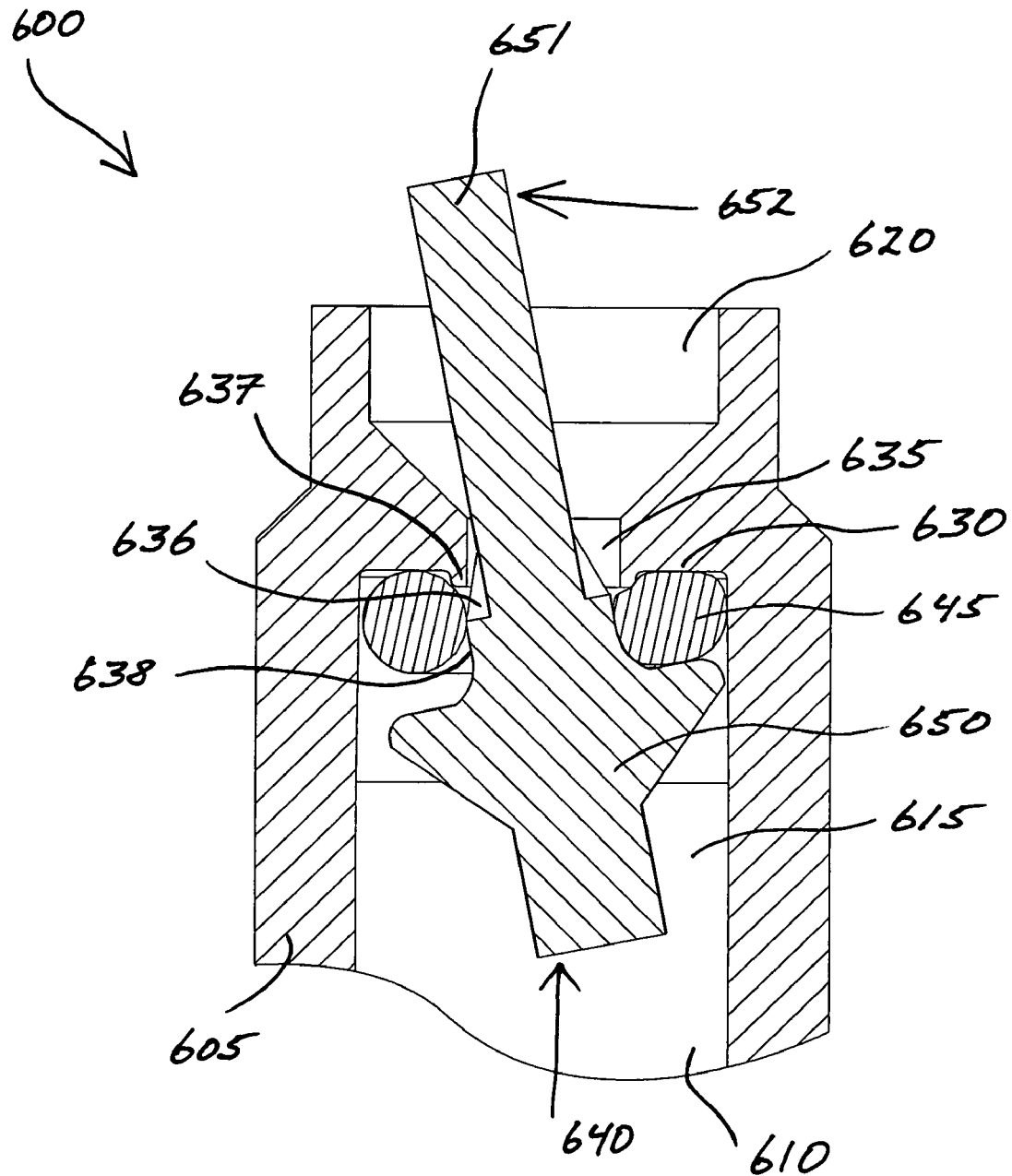
FIG. 6D illustrates a side sectional view of the non-axial actuable valve from FIG. 6A in an actuated open position, in accordance with an embodiment of the present invention.
Figure 6E:
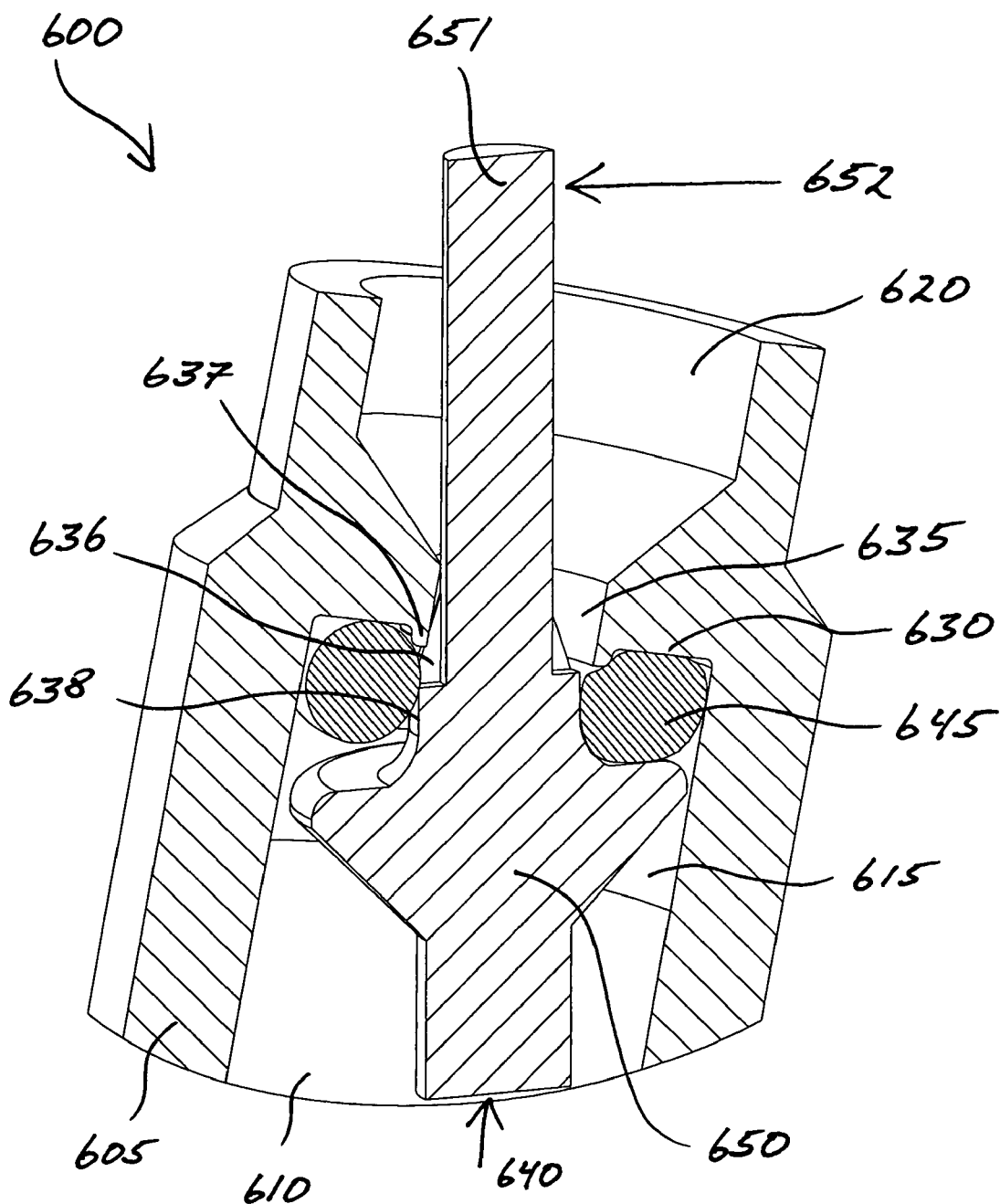
FIG. 6E illustrates an isometric sectional view of the non-axial actuable valve from FIG. 6D detailing integrated vents about the base of the actuation stem.

FIGS. 6D and 6E illustrate a side cross-sectional view of non-axially actuable valve 600 shown in a pivoted open position, and an isometric cross-section view also in a pivoted open position, respectively, in accordance with an embodiment of the present invention. An actuation force 652 is illustrated as acting on actuation stem 651. The likelihood that seal 645 will extrude out of valve body through hole 635 is considerably minimized over the PRIOR-ART examples due to elastomeric seal support features as follows: Circumferential seal lip 637, in conjunction with rocker element alignment portion 638, and tapered supportive vent ribs 636 drastically reduce the likelihood that elastomeric seal 645 will extrude into valve body through hole 635. Yet, fluid will be allowed to pass through valve body through hole 635. At any angle in the tilt range of actuation stem 651 wherein valve 600 is actuated open, the causative principle of the invention incorporates a non-sealable condition on a portion between valve seat 630, seal 645, and rocker element 650, thus allowing fluid to exit valve second end 620 while not creating a substantial gap allowing for seal extrusion.

As discussed previous, each of the exemplary embodiments describe a seal using an o-ring and a spring force using a traditional compression spring. One skilled in the art of sealing and creating mechanical biasing forces in mechanisms realizes that a handful of methods and hardware can literally be interchanged to accomplish identical or substantially similar functions without drifting from the causative principle of the representative teachings, according to the embodiments, each having advantages and drawbacks in comparison to the other similar designs.

That said, to the extent that such modifications and variations do not depart from the spirit of the invention, they are intended to be included within the scope thereof which is limited only by a fair assessment of the following claims.

Having fully described the present invention and alternately preferred embodiments thereof in such clear and concise terms as to enable those skilled in the art to understand and practice the same without the need for undue experimentation, the invention claimed is:

What is claimed is:

1. A fluid valve actuable by a non-axial force comprising;
   a valve body defining an interior bore comprising a first diameter;
   a valve seat defining an end of said bore, wherein said valve seat is formed to include an aperture comprising a second diameter extending therethrough;
   a rocker seat comprising:
      an arrowhead shaped portion moveably disposed within said bore and having a third diameter, wherein said third diameter is less than said first diameter and greater than said second diameter;
      a cylindrical portion attached to said arrow-head shaped portion and extending outwardly therefrom, wherein:

said cylindrical portion comprises a fourth diameter;
said fourth diameter is less than said second diameter;
said cylindrical portion extends through said aperture and outwardly from said valve body;
an annular seal disposed between said arrow-head shaped portion and said valve seat; and
an annular floating seal support disposed between said seal and said cylindrical portion, wherein a first portion of said annular floating seal support extends into said aperture, and wherein a second portion of said annular floating seal support extends into said bore.

2. The fluid valve of claim 1, wherein:
said first portion of said annular floating seal support comprises a fifth diameter, wherein said fifth diameter is greater than said fourth diameter and less than said second diameter;
said second portion of said annular floating seal support comprises a sixth diameter, wherein said sixth diameter is greater than said second diameter and less than said first diameter.

* * * * *